US010142148B2

(12) United States Patent
Lee et al.

(10) Patent No.: US 10,142,148 B2
(45) Date of Patent: Nov. 27, 2018

(54) METHOD FOR TRANSMITTING FRAME, CLEAR CHANNEL ASSESSMENT METHOD, AND APPARATUS IMPLEMENTING THE SAME METHOD

(71) Applicant: NEWRACOM, INC., Irvine, CA (US)

(72) Inventors: Ilgu Lee, Daejeon (KR); Kyeongpyo Kim, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 96 days.

(21) Appl. No.: 14/932,833

(22) Filed: Nov. 4, 2015

(65) Prior Publication Data

US 2016/0135224 A1    May 12, 2016

Related U.S. Application Data

(60) Provisional application No. 62/077,077, filed on Nov. 7, 2014.

(30) Foreign Application Priority Data

Nov. 3, 2015    (KR) ..................... 10-2015-0154116

(51) Int. Cl.
| | | |
|---|---|---|
| H04L 27/26 | (2006.01) | |
| H04W 74/08 | (2009.01) | |
| H04W 84/12 | (2009.01) | |
| H04L 5/00 | (2006.01) | |

(52) U.S. Cl.
CPC ..... *H04L 27/2607* (2013.01); *H04W 74/0808* (2013.01); *H04L 5/0007* (2013.01); *H04L 5/0037* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0146869 A1* | 7/2006 | Zhang | H04W 28/20 370/465 |
| 2011/0305156 A1* | 12/2011 | Liu | H04L 5/0037 370/252 |
| 2013/0337806 A1* | 12/2013 | Barash | H04W 48/16 455/434 |
| 2015/0071215 A1* | 3/2015 | Tian | H04W 24/08 370/329 |
| 2016/0112236 A1* | 4/2016 | Dhayni | H04L 27/2666 375/340 |
| 2016/0197756 A1* | 7/2016 | Mestdagh | H04L 27/2614 375/295 |
| 2016/0330047 A1* | 11/2016 | Seok | H04L 27/2602 |
| 2017/0027001 A1* | 1/2017 | Choi | H04W 74/0816 |
| 2017/0207890 A1* | 7/2017 | Liu | H04L 5/0044 |

* cited by examiner

Primary Examiner — Noel R Beharry
Assistant Examiner — Nicole King

(57) ABSTRACT

A method for transmitting frames of a device in a wireless local area network (WLAN) includes generating a symbol in which legacy cyclic prefixes are periodically located and transmitting a frame including the symbol, wherein the symbol includes a data duration excluding cyclic prefix in symbol duration, and the length of the data duration is longer than 3.2 us.

12 Claims, 29 Drawing Sheets

FIG. 18

| Secondary channel #n+3 | preamble | Data(STA1→AP1) | SIFS | Ack |
| Secondary channel #n+2 | Busy(STA2→AP2) | | | Ack |
| Secondary channel #n+1 | preamble | Data(STA1→AP1) | SIFS | Ack |
| Primary channel #n | preamble | Data(STA1→AP1) | SIFS | Ack |

FIG. 19

| | | | | | |
|---|---|---|---|---|---|
| | IEEE 802.11ax format inserted legacy CP pattern | | | | |
| | IEEE 802.11ax format | | | | |
| Secondary channel #n+3 | IEEE 802.11ax format | | | | |
| Secondary channel #n+2 | Legacy CP pattern-inserted IEEE 802.11ax format | | | | |
| Secondary channel #n+1 | preamble | Data(STA1→AP1) | SIFS | Ack | |
| Primary channel #n | preamble | Data(STA1→AP1) | SIFS | Ack | |

FIG. 27

| | | | | | Low power transmission | |
|---|---|---|---|---|---|---|
| Subchannel#1 | L-STF | L-LTF | L-SIG | HE-SIGA | HE-SIGB | HE-STF, HE-LTF, HE-SIG, HE-DATA |
| | | | | | | HE-STF, HE-LTF, HE-SIG, HE-DATA |
| Subchannel#2 | L-STF | L-LTF | L-SIG | HE-SIGA | HE-SIGB | HE-STF, HE-LTF, HE-SIG, HE-DATA |
| | | | | | | HE-STF, HE-LTF, HE-SIG, HE-DATA |
| Subchannel#3 | L-STF | L-LTF | L-SIG | HE-SIGA | HE-SIGB | HE-STF, HE-LTF, HE-SIG, HE-DATA |
| | | | | | | HE-STF, HE-LTF, HE-SIG, HE-DATA |
| Subchannel#4 | L-STF | L-LTF | L-SIG | HE-SIGA | | HE-STF, HE-LTF, HE-SIG, HE-DATA |

FIG. 28

| | | | | | Low power transmission | |
|---|---|---|---|---|---|---|
| Subchannel#1 | L-STF | L-LTF | L-SIG | HE-SIGA | HE-SIGB | HE-STF, HE-LTF, HE-SIG, HE-DATA |
| Subchannel#2 | L-STF | L-LTF | L-SIG | HE-SIGA | | HE-STF, HE-LTF, HE-SIG, HE-DATA |
| | | | | | | HE-STF, HE-LTF, HE-SIG, HE-DATA |
| | | | | | | HE-STF, HE-LTF, HE-SIG, HE-DATA |
| Subchannel#3 | L-STF | L-LTF | L-SIG | HE-SIGA | HE-SIGB | HE-STF, HE-LTF, HE-SIG, HE-DATA |
| Subchannel#4 | L-STF | L-LTF | L-SIG | HE-SIGA | | HE-STF, HE-LTF, HE-SIG, HE-DATA |
| | | | | | | HE-STF, HE-LTF, HE-SIG, HE-DATA |
| | | | | | | HE-STF, HE-LTF, HE-SIG, HE-DATA |

METHOD FOR TRANSMITTING FRAME, CLEAR CHANNEL ASSESSMENT METHOD, AND APPARATUS IMPLEMENTING THE SAME METHOD

CROSS-REFERENCE TO RELATED APPLICATION

This application claims priority to and the benefit of U.S. Patent Application No. 62/077,077 filed in the USPTO on Nov. 7, 2014, and Korean Patent Application No. 10-2015-0154116 filed in the Korean Intellectual Property Office on Nov. 3, 2015, the entire contents of which are incorporated herein by reference.

BACKGROUND (a) Field

The described technology relates generally to a method and an apparatus for transmitting frame, and more particularly, to a method and an apparatus for transmitting frame in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, the IEEE standard 802.11b (IEEE Std 802.11b-1999) supporting 5 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11ac (IEEE 802.11ac-2013) for enhancements for very high throughput (VHT) was published in 2013. Recently, a high efficiency (HE) WLAN for enhancing the system throughput in high density scenarios is being developed by the IEEE 802.11ax task group.

Since a WLAN uses an unlicenced frequency bandwidth, various devices exist to cause interference. In order to prevent collision with other devices, a WLAN device uses a carrier sense multiple access/collision avoidance (CSMA/CA) scheme to perform communication only when a channel is not in use. Here, the WLAN device performs a clear channel assessment (CCA) to determine whether a channel is in use, and when the CCA value is higher than a threshold value, the WLAN device determines that a channel is in use and defers transmission to the corresponding channel.

In the IEEE 802.11n standard, different CCA methods are applied to a primary channel and a secondary channel. That is, a primary channel CCA uses a signal detection method through virtual carrier detection and a secondary channel CCA uses only an energy detection method. Here, CCA threshold values respectively set for valid 20 MHz and 40 MHz bandwidth of a primary channel are −82 dBm and −79 dBm, and a CCA threshold value set for a secondary channel is −62 dBm. The difference between the CCA threshold values of the primary channel and the secondary channel causes unfairness between the primary channel and the secondary channel. Also, since the CCA threshold value of the secondary channel is higher than that of the primary channel, there is a higher possibility of collision in the secondary channel than in the primary channel.

The IEEE 802.11ac standard supports 80 MHz or 160 MHz, wider bandwidth than that of the IEEE 802.11n standard, and thus, a wireless communication network of the IEEE 802.11ac standard includes a larger number of secondary channels than that of the IEEE 802.11n standard. Thus, in order to increase CCA performance of the secondary channel, the IEEE 802.11 standard has adopted a guard interval (GI) correlation-based CCA. Since a GI may be formed by a cyclic prefix (CP), the GI correlation may be termed a CP correlation. The CP correlation-based CCA is a method for determining whether a channel is in use on the basis of a CP correlation, in which a −72 dBm threshold value is used for every 20 MHz channel. Thus, the IEEE 802.11ac standard may increase CCA sensitivity of a secondary channel to −72 dBm.

The IEEE 802.11ax task group is developing a high efficiency WLAN (HEW) robust to delay spread and supporting high aggregate throughput. To this end, the IEEE 802.11ax uses a larger number of subcarriers by applying 128 or 256-point FFT, instead of 64-point FFT previously used in the 20 MHz bandwidth. Also, the IEEE 802.11ax uses a longer CP by two or four times than existing 0.8 us.

A VHT device supporting the IEEE 802.11ac standard is implemented to calculate a CP correlation in symbol unit of 4 us/3.6 us, and thus, if a length of the received symbol is different from 4 us/3.6 us, it is difficult to calculate the CP correlation. In a HEW environment in which the HEW device supporting the IEEE 802.11ax and the VHT device coexist, if the VHT device cannot calculate the CP correlation of a frame transmitted from the HEW device, it will lead to difficulty in using a CP correlation-based CCA in a secondary channel.

SUMMARY

An embodiment of the present disclosure provides a method for transmitting frame, clear channel assessment method, and an apparatus implementing the same method.

According to an embodiment, a method for transmitting frames of a device in a wireless local area network (WLAN) includes generating a symbol in which legacy cyclic prefixes are periodically located and transmitting a frame including the symbol, wherein the symbol includes a data duration excluding cyclic prefix in symbol duration, and the length of the data duration is longer than 3.2 us.

The legacy cyclic prefixes may be located at a predetermined interval in the data duration of the symbol.

The legacy cyclic prefixes may be located at every 3.2 us interval in the symbol.

A length of the legacy cyclic prefix may be 0.8 us or 0.4 us.

The legacy cyclic prefixes may be included in the symbol such that correlation peak appears at every 4 us or 3.6 us when a CP correlation of the symbol is calculated.

The symbol may include the legacy cyclic prefixes corresponding to a legacy cyclic prefix pattern, and the legacy cyclic prefix pattern may show that the legacy cyclic prefixes are located at every 3.2 us interval.

The symbol may be generated by using a 128-point FFT or 256-point FFT.

According to another exemplary embodiment, a method for transmitting frames of a device in a wireless local area network (WLAN) includes generating a symbol satisfying backward compatibility and transmitting a frame including the symbol in at least one backward compatibility band designated among a plurality of bands, wherein the symbol includes legacy cyclic prefixes corresponding to a legacy pattern, and the legacy pattern shows the legacy cyclic prefixes periodically transmitted in a legacy frame.

The backward compatibility band may include guard bands which are in both ends of the plurality of bands.

The backward compatibility band may include guard bands which are in both ends of the plurality of bands, and at least one of middle bands which are in the middle of the plurality of bands.

The symbol may include a data duration excluding cyclic prefix in symbol duration, and the length of the data duration is longer than 3.2 us.

The legacy pattern may show that the legacy cyclic prefixes are located at every 3.2 us interval.

The legacy cyclic prefixes may be located at a predetermined interval in the data duration of the symbol.

A length of the legacy cyclic prefix may be 0.8 us or 0.4 us.

The legacy cyclic prefixes may be included in the symbol such that a correlation peak appears at every 4 us or 3.6 us when a CP correlation of the symbol is calculated.

According to yet another embodiment, a clear channel assessment (CCA) method of a wireless local area network (WLAN) device includes decoding a signal field of a frame received in a first channel by a first decoder and determining whether the first channel is occupied by comparing a decoding result with a CCA threshold value set in the first channel, wherein the first decoder is separated from a second decoder decoding a frame received in a second channel.

The CCA threshold value may be lower than −72 dBm.

The first decoder may decode a binary phase shift keying (BPSK)-modulated signal.

According to an exemplary embodiment, since a VHT device is able to recognize cyclic prefixes in a frame transmitted from a HEW device, the VHT device may be able to use a CP correlation-based CCA in a HEW environment. According to an exemplary embodiment, since a VHT device may determine whether a channel is occupied by the HEW device by applying the CP correlation-based CCA in a secondary channel, a collision probability in a HEW environment may be lowered and network throughput may be increased.

BRIEF DESCRIPTION OF THE DRAWINGS

FIG. 17, FIG. 18 and FIG. 19 are diagrams illustrating secondary channel CCA according to an exemplary embodiment.

FIG. 24, FIG. 25, FIG. 26, FIG. 27 and FIG. 28 are diagrams illustrating a frame format according to an exemplary embodiment.

DETAILED DESCRIPTION OF THE EMBODIMENTS

Figure 1:
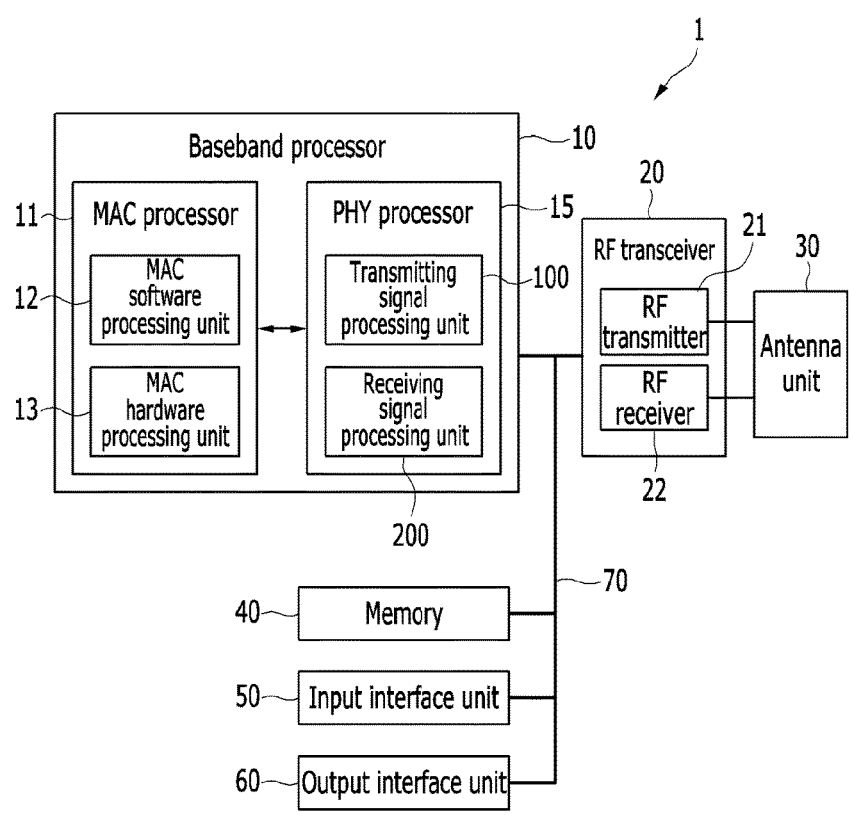
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to as "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
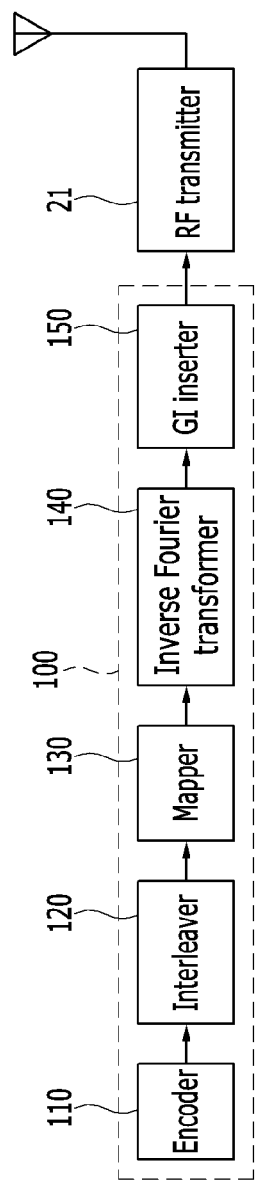
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
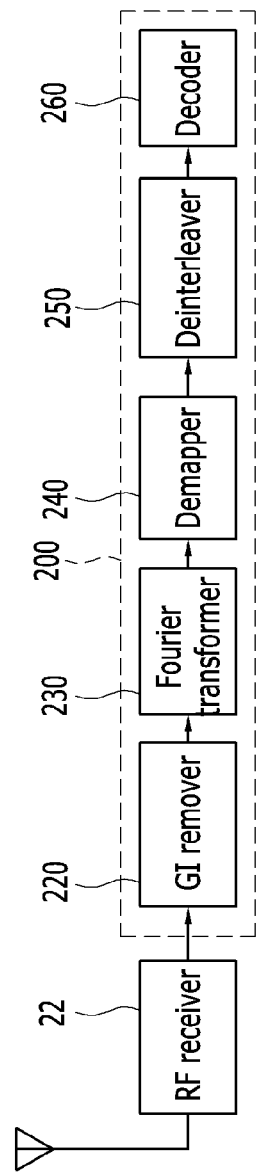
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
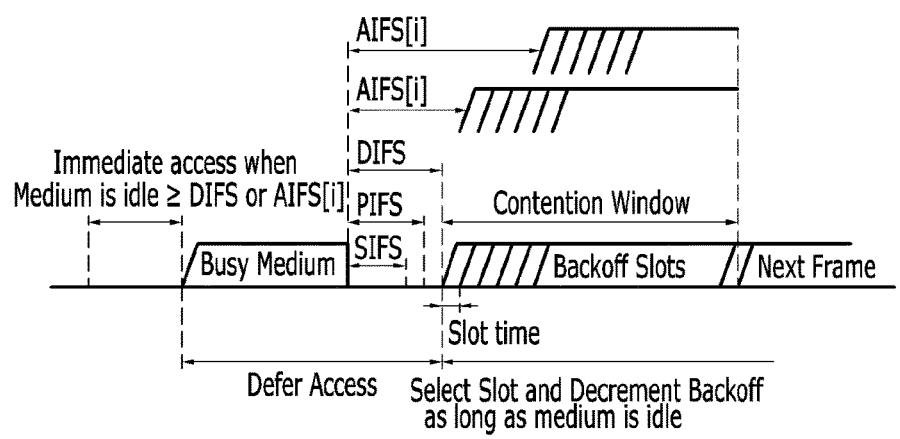
FIG. 4 exemplifies illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
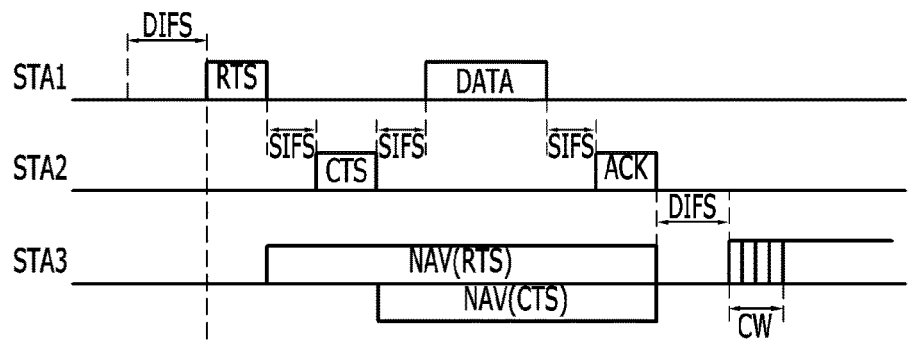
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

A frame described hereinafter is a physical layer (PHY) frame, which may be, for example, a physical layer convergence procedure (PLCP) frame. A frame includes orthogonal frequency division multiplexing (OFDM) symbols.

Figure 6:
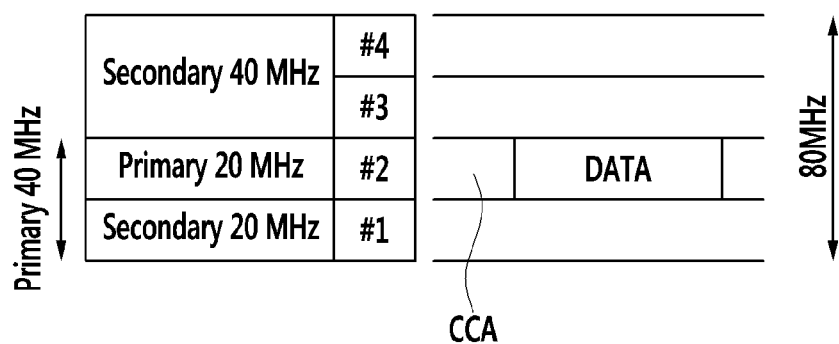
FIG. 6 is a diagram illustrating a bandwidth according to an exemplary embodiment.
Figure 7:
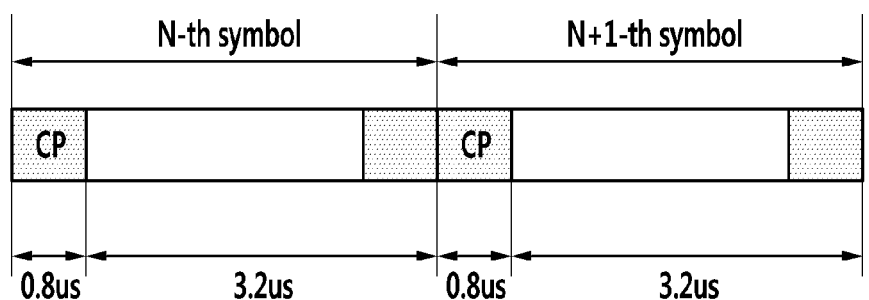
FIG. 7 shows a symbol in which 64-point FET is applied to a 20 MHz bandwidth in a wireless communication network according to an exemplary embodiment.
Figure 8:
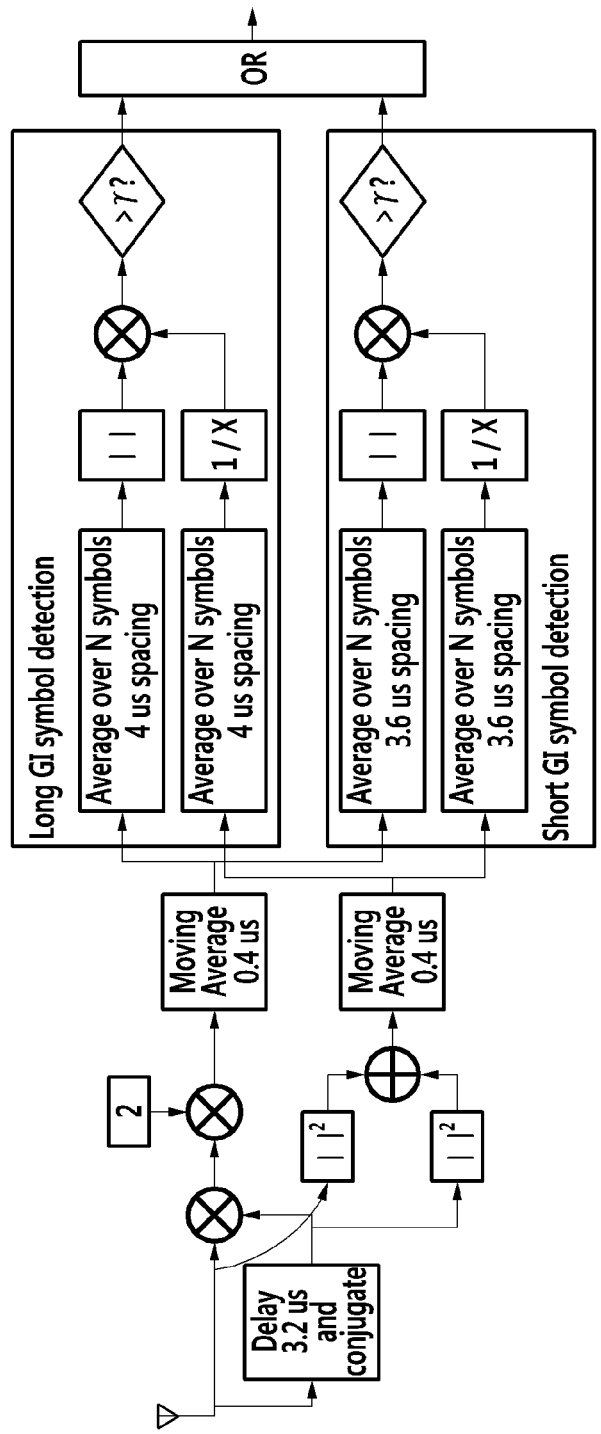
FIG. 8 shows a method for calculating a cyclic prefix (CP) correlation according to an exemplary embodiment.

FIG. 6 is a diagram illustrating a bandwidth according to an exemplary embodiment, FIG. 7 shows a symbol in which 64-point FET is applied to a 20 MHz bandwidth in a wireless communication network according to an exemplary embodiment, and FIG. 8 shows a method for calculating a cyclic prefix (CP) correlation according to an exemplary embodiment.

Referring to FIG. 6, a wireless communication network according to an exemplary embodiment may support a wide bandwidth such as 40 MHz, 80 MHz, 160 MHz, or 80+80 MHz, as well as 20 MHz. For example, in a case in which the wireless communication network supports an 80 MHz bandwidth, 80 MHz may be divided into four bands, and each of the bands may have a 20 MHz bandwidth. The four bands may be divided into a 20 MHz primary channel (channel #2) and secondary channels (channel #1, channel #3, and channel #4). 40 MHz primary channels are channel #1 and channel #2, and 40 MHz secondary channels are channel #3 and channel #4. Here, the secondary channels are channels, not primary channels, which may be termed non-primary channels.

The WLAN device performs clear channel assessment (CCA) before transmitting packets to a channel. When a value detected in the channel is higher than a CCA threshold value set in the channel, the WLAN device determines that the channel is in use and defers a transmission attempt.

The WLAN device applies different CCAs to the primary channels and the secondary channels.

The primary channel CCA uses a signal detection method through virtual carrier sensing and an energy detection method. When a signal or energy equal to or greater than the threshold values defined in Table 1 is detected from the primary channel, the WLAN device determines that the primary channel is in use. For example, when a signal equal to or higher than −82 dBm is detected from a 20 MHz primary channel, the WLAN device determines that the 20 MHz primary channel is in use.

TABLE 1

| bandwidth | Primary channel CCA |
|---|---|
| 20 MHz, 40 MHz, 80 MHz, 160 MHz or 80 + 80 MHz | Any signal within the primary 20 MHz channel at or above −62 dBm The start of a 20 MHz PPDU in the primary 20 MHz channel at or above −82 dBm |
| 40 MHz, 80 MHz, 160 MHz or 80 + 80 MHz | The start of a 40 MHz NON_HT duplicate or VHT format PPDU in the primary 40 MHz channel at or above −79 dBm |
| 80 MHz, 160 MHz or 80 + 80 MHz | The start of an 80 MHz NON_HT duplicate or VHT format PPDU in the primary 80 MHz channel at or above −76 dBm |
| 160 MHz or 80 + 80 MHz | The start of a 160 MHz or 80 + 80 MHz NON_HT duplicate or VHT format PPDU at or above −73 dBm |

The secondary channel CCA uses an energy detection method and a mid-packet detection method using a cyclic prefix (CP) correlation. The mid-packet detection method using the CP correlation may simply be termed a CP correlation-based CCA or mid-packet CCA.

When energy equal to or higher than −62 dBm is detected from the 20 MHz secondary channel (secondary 20), the WLAN device determines that the secondary channel is in use. The same CCA method is applied to the 40 MHz secondary channel (secondary 40) and the 80 MHz secondary channel (secondary 80). A threshold value of the 40 MHz secondary channel is −59 dBm, and a threshold value of the 80 MHz secondary channel is −56 dBm.

The IEEE 802.11ac standard for very high throughput (VHT) adopts guard interval (GI) correlation-based CCA. The GI may be formed by a cyclic prefix (CP), the GI correlation may be referred to as a CP correlation. The CP correlation-based CCA is a method for detecting a symbol on the basis of the CP correlation, and in this method, −72 dBm threshold value is used for every 20 MHz channel.

A WLAN device (hereinafter, referred to as a "VHT device") supporting the IEEE 802.11ac standard calculates a CP correlation, and when it is detected in the 20 MHz secondary channel (secondary 20) at or above −72 dBm, with a probability of 90% or more within a CCA mid-time request time (CCAMidTime) (<25 us), the WLAN device determines that the corresponding secondary channel is in use. Since 25 us is required for the CP correlation-based CCA, a maximum of six contiguous symbols (in case of 4 us unit) are used.

Referring to FIG. 7, the VHT device transmits 64-point FFT symbols. The 64-point FFT symbols in the 20 MHz bandwidth includes a data duration and a guard interval (GI) prepended to the data duration. The length of the data duration (symbol duration excluding GI in symbol) is 3.2 us. The length of the GI is 0.4 us or 0.8 us. The GI may be formed as a CP of the data duration. Since the CP of 0.8 us corresponds to ¼ of the data length of 3.2 us, the CP may be referred to as a ¼ CP.

When the 64-point FFT symbols are continuously transmitted, the CPs shows a cyclic prefix periodicity appearing at every predetermined interval. Thus, when a receive device calculates a CP correlation of the signal transmitted based on 64-point FFT, a CP correlation peak appears at every 4 us or 3.6 us. Hereinafter, a CP pattern transmitted such that the CP correlation peak is detected at every 4 us/3.6 us will be referred to as a "legacy CP pattern". The legacy CP pattern corresponds to CPs transmitted in consecutive legacy symbols (for example, 64-point FFT symbols), and an interval between the CPs is 3.2 us as a data duration of the legacy symbol.

Referring to FIG. 8, OFDM symbols may be identified by CP patterns repeated regularly. Since the distance between CPs of the 64-point FFT symbols is 3.2 us, the VHT WLAN device delays a receive signal by 3.2 us through an antenna to calculate a CP correlation, and detects the 64-point FFT symbol, that is 4 us-symbol (in case of a long GI) or the 3.6 us-symbol (in case of a short GI) on the basis of the calculated CP correlation.

In this manner, the VHT WLAN device may detect the 64-point FFT symbols by the CP correlation, and simply check whether a secondary channel is in use on the basis of the detected symbols.

Figure 9:
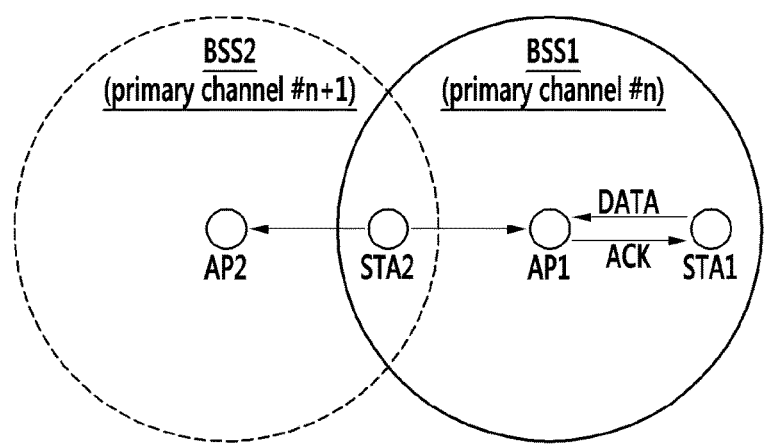
FIG. 9 is a diagram illustrating a wireless communication network according to an exemplary embodiment.

FIG. 9 is a diagram illustrating a wireless communication network according to an exemplary embodiment.

Referring to FIG. 9, the wireless communication network may include a plurality of overlapping basic service set (BSS). For example, the wireless communication network includes AP1, AP2, STA1, and STA2. It is assumed that AP1 and STA1 are included in BSS1, AP2 and STA2 are included in BSS2, and STA2 may access AP1. In BSS1, it is assumed that channel #n is a primary channel, and channel #n+1 is a secondary channel. In BSS2, it is assumed that channel #1+1 is a primary channel and channel #n is a secondary channel.

The STA1 transmits data in the channel #n as a primary channel of the BSS1 to the AP1, and the STA2 transmits data in the channel #n+1 as a primary channel of the BSS2 to the AP2. In a case in which the STA1 and STA2 each want to transmit data in a secondary channel, the STA1 and STA2 perform secondary channel CCA and determine a state of a secondary channel.

The STA1 and STA2 each check secondary channel CCA by a CP correlation in the secondary channel. In a case in which the STA1 and STA2 each are VHT devices following the IEEE 802.11ac standard, the STA1 and STA2 may each detect a 64-point FFT symbol in the same manner as that of FIG. 8. Thus, the STA1 may detect a symbol of a frame transmitted from the STA2 in the secondary channel (channel #n+1), and determine whether the channel is in use on the basis of the detected symbol. The STA2 may also detect a symbol of a frame transmitted from the STA1 in the secondary channel (channel #n), and determine whether the channel is in use on the basis of the detected symbol.

Meanwhile, the STA1 may be a VHT device, and the STA2 may be a WLAN device supporting high efficiency WLAN (HEW) (hereinafter, referred to as a "HEW device") being developed by the IEEE 802.11ax task group.

Hereinafter, a method for providing backward compatibility for a CP correlation-based CCA in a HEW environment in which a VHT device and a HEW device coexist will be described. That is, a method in which the VHT device is able to use CP correlation-based CCA with respect to a frame transmitted from the HEW device will be described.

Figure 10:
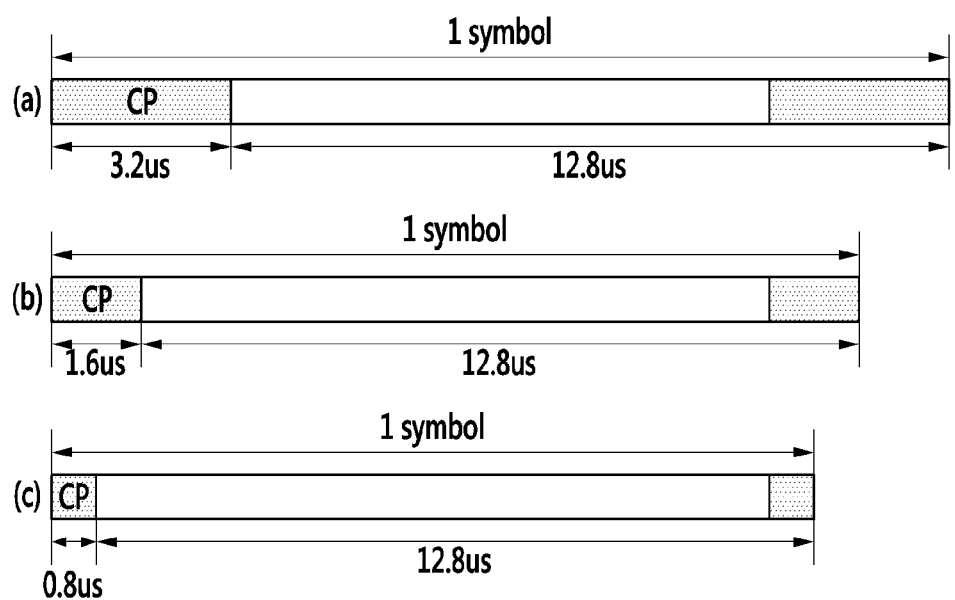
FIG. 10 shows symbols using 256-point FFT in a wireless communication network according to an exemplary embodiment.

FIG. 10 shows symbols using 256-point FFT in a wireless communication network according to an exemplary embodiment.

Referring to FIG. 10, in the IEEE 802.11ax, for more robust against delay spread and higher throughput in the limited frequency resources, a larger number of subcarriers are transmitted and a longer CP is transmitted. In the IEEE 802.11ax, 128-point or 256-point FFT, instead of existing 64-point FFT used in a 20 MHz bandwidth, is used, and also, a longer CP by two or four times than an CP having a length of 0.8 us is used.

For example, a HEW symbol using 256-point FFT includes a data duration of 12.8 us and a CP prepended to the data duration. The length of CP may be 3.2 us as illustrated in (a) of FIG. 10. The length of CP may be 1.6 us as illustrated in (b) of FIG. 10. The length of CP may be 0.8 us as illustrated in (c) of FIG. 10.

In this manner, the HEW device transmits a symbol longer than that of the VHT device. Here, the VHT device is implemented to calculate a CP correlation only for signal transmitted with a legacy CP pattern. Thus, in the HEW environment in which the HEW device and the VHT device coexist, if the HEW device forms a CP pattern different from the legacy CP pattern and transmits signal, the VHT device cannot detect a CP correlation peak at every 4 us/3.6 us in the receive signal so it cannot recognize a HEW symbol.

Hereinafter, a method for guaranteeing backward compatibility of CP correlation-based CCA by transmitting, by a HEW device, frame having a CP pattern that may be recognized by a VHT device will be described in detail.

Figure 11:
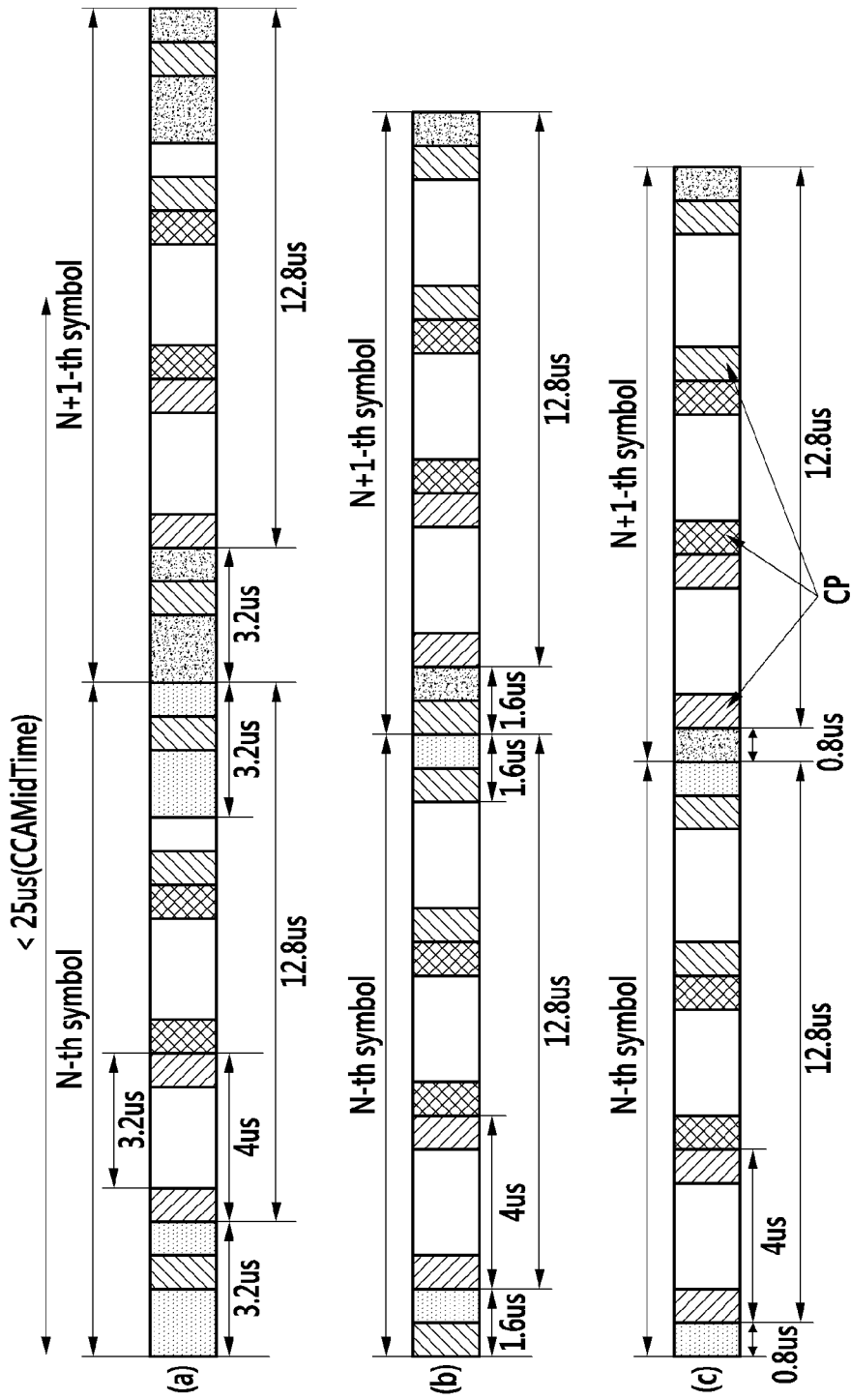
FIG. 11 shows frame formats for backward compatibility in a wireless communication network according to an exemplary embodiment.

FIG. 11 shows frame formats for backward compatibility in a wireless communication network according to an exemplary embodiment.

Referring to FIG. 11, the HEW device may configure symbols to have a CP pattern (legacy CP pattern) that may be recognized by the VHT device. The HEW device may configure CPs with the legacy CP pattern in a data duration of each of the symbols. The CPs of 0.8 us or 0.4 us are inserted to each interval of 3.2 us in the data duration like the legacy CP pattern. That is, the HEW device adds the CPs in such a pattern as that in which a symbol of 4 us/3.6 us is transmitted, so that the VHT device may be able to calculate a CP correlation. Thus, the VHT device may calculate a correlation based on the legacy CP pattern of the HEW symbol.

In a case in which the HEW device transmits the 256-point FFT symbol illustrated in (a), (b), and (c) of FIG. 10, the data duration of 12.8 us is formed to have a pattern in which the CP (0.8 us/0.4 us) of the legacy symbol is prepended in every 3.2 us duration corresponding to the data duration of the legacy symbol. (a), (b), and (c) of FIG. 11 illustrate examples of CPs added to each of the data durations having a length of 3.2 us in the 256-point FFT symbols illustrated in (a), (b), and (c) of FIG. 10. The CP added to the data duration having a length of 3.2 us is same with the duration of 0.8 us/0.4 us located at the end of 3.2 us. Referring to (a), (b), and (c) of FIG. 11, the CPs (3.2 us/1.6 us/0.8 us) prepended to the data durations of each of the HEW symbols are formed to be the same as the durations of 3.2 us/1.6 us/0.8 us positioned at the end of the data durations of each of the HEW symbols.

Meanwhile, every symbol of transmission frame does not need to have the added CPs for backward compatibility. Instead, symbol durations satisfying a CCA mid-time request time (<25 us) only need to have the added CPs for backward compatibility Table shows CP protection against delay spread calculated for the frame formats of FIG. 11 and a data rate loss ratio.

TABLE 2

| bandwidth | CP type | CP protection against delay spread | Increased overhead | Data rate loss ratio |
| --- | --- | --- | --- | --- |
| 20 MHz | X4 CP (=3.2 us) | 4.0 us | 1.6 us | 2.4/12.8 = 18.75% |
|  | X2 CP (=1.6 us) | 2.4 us | 1.6 us |  |
|  | X1 CP (=0.8 us) | 1.6 us | 1.6 us |  |
| 40 MHz |  | — |  | 2.4 * 2/12.8 * 2 = 18.75% |
| 80 MHz |  | — |  | 2.4 * 2/12.8 * 4 = 9.4% |
| 160 MHz |  | — |  | 2.4 * 2/12.8 * 8 = 4.6% |

FIGS. 12 through 16 show a method for transmitting frames for backward compatibility in multiple bands supported in a wireless communication network according to an exemplary embodiment. FIGS. 12 through 16 will be described using the frame format of (c) of FIG. 11 as an example.

Figure 12:
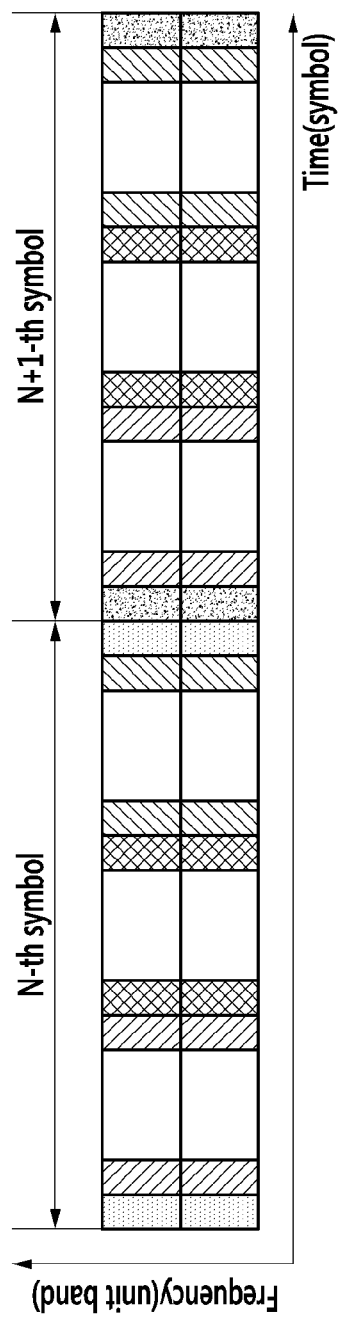
FIG. 12, FIG. 13, FIG. 14, FIG. 15 and FIG. 16 show a method for transmitting frames for backward compatibility in multiple bands supported in a wireless communication network according to an exemplary embodiment.

Referring to FIG. 12, the HEW device may transmit a frame by using two bands. Here, the HEW device transmits symbols including a CP pattern (legacy CP pattern) for backward compatibility in two bands. Here, each of the bands may have a bandwidth of 20 MHz, or may have a more narrow bandwidth than 20 MHz.

Figure 13:
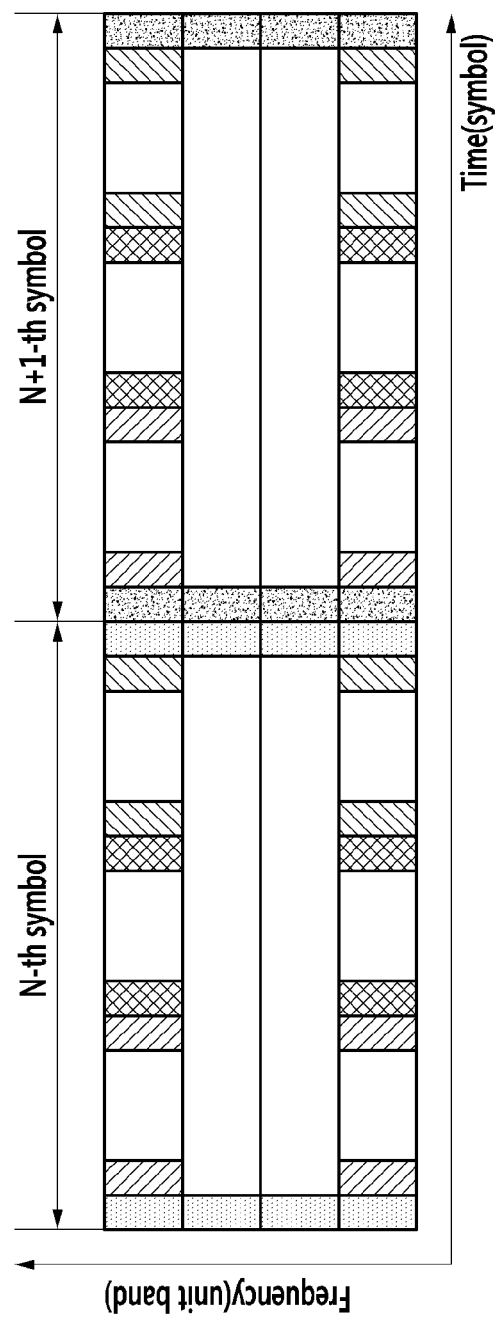
Figure 14:
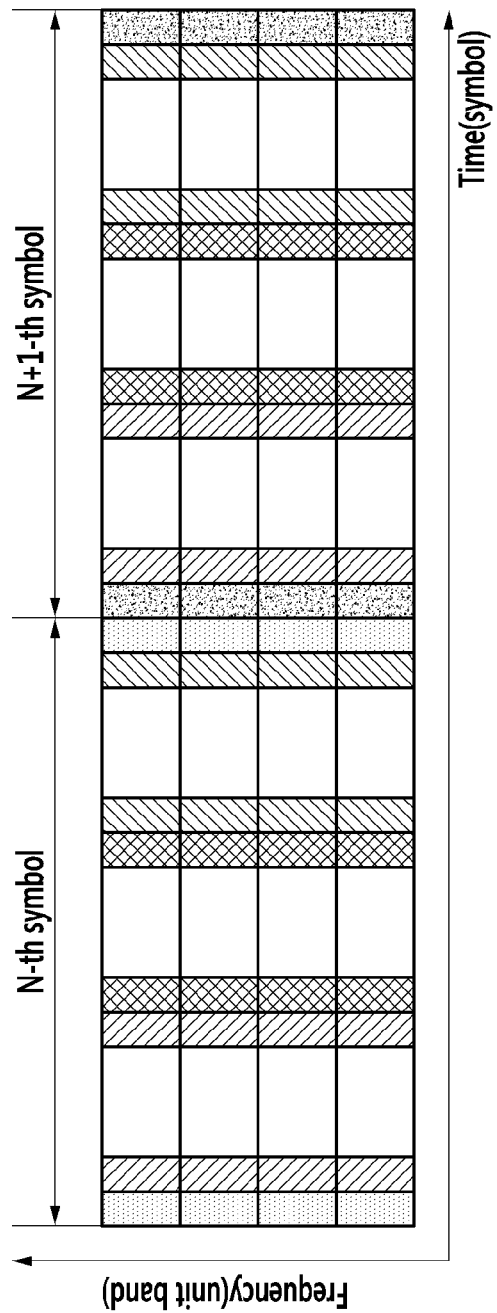

Referring to FIGS. 13 and 14, the HEW device may transmit a frame by using four bands. Here, the NEW device selects at least two of the four bands, as backward compatibility bands. The HEW device transmits symbols including a CP pattern for backward compatibility in the backward compatibility bands. The backward compatibility bands may essentially include both end bands of the entire transmission bands, that is, two guard bands. The backward compatibility bands may selectively include at least one middle band of the entire transmission bands. According to an exemplary embodiment, the HEW device may transmit symbols including CP patterns for backward compatibility in the guard bands among four bands as illustrated in FIG. 13. According to another exemplary embodiment, the HEW device may insert CP patterns for backward compatibility to symbols transmitted in all the transmission bands as illustrated in FIG. 14.

Figure 15:
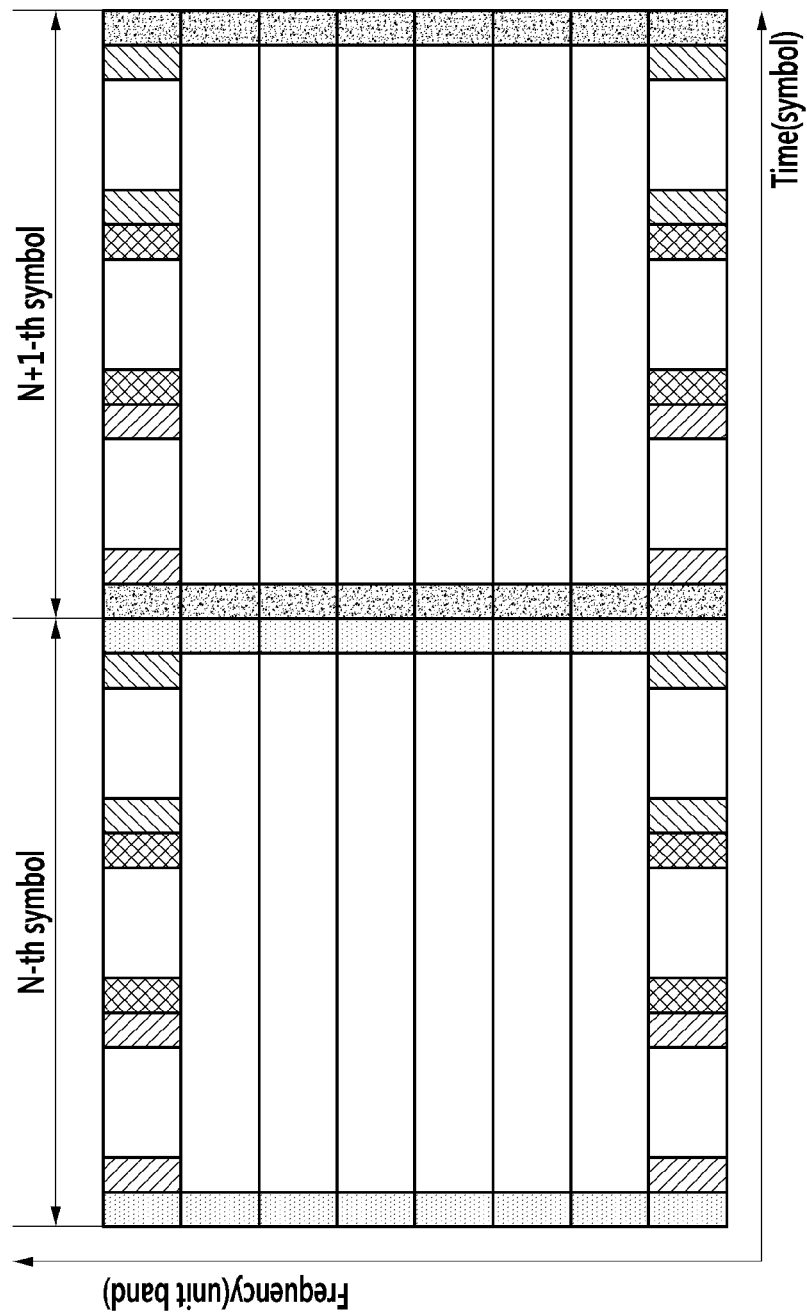
Figure 16:
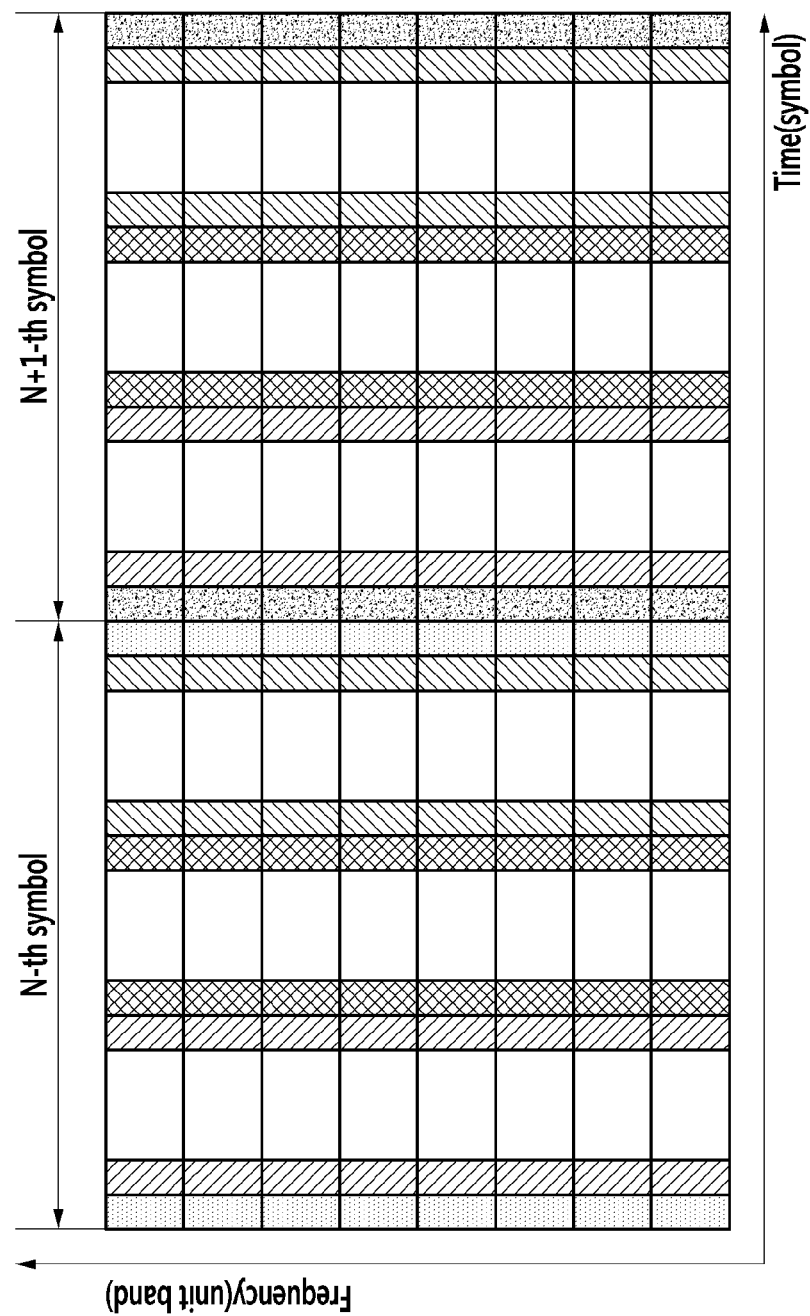

Referring to FIGS. 15 and 16, the HEW device may transmit a frame by using eight bands. Here, the HEW device selects at least two of the eight bands, as backward compatibility bands. The HEW device transmits symbols including CP patterns for backward compatibility in the backward compatibility bands. The backward compatibility bands may essentially include guard bands. The backward compatibility bands may selectively include at least one middle band among the entire transmission bands. According to an exemplary embodiment, the HEW device may transmit the symbols including CP patterns for backward compatibility in the guard bands among the eight bands as illustrated in FIG. 15. According to another exemplary embodiment, the HEW device may transmit symbols including CP patterns for backward compatibility in all the transmission bands as illustrated in FIG. 16.

Figure 17:
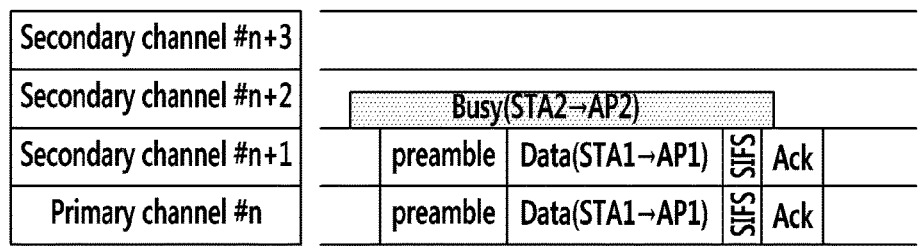

FIGS. 17 through 19 are diagrams illustrating secondary channel CCA according to an exemplary embodiment.

Referring to FIG. 17, in the HEW environment in which various wireless communication networks coexist, it is assumed that the VHT device STA1 of the BSS1 transmits a frame to an AP1 in the primary channel (channel #n) and the secondary channel (channel #n+1) and the WLAN device STA2 of the BSS2 transmits a frame to the AP2 in the channel #n+2.

The STA1 may extend a transmission channel to the adjacent secondary channel (channel #n+2). To this end, the STA1 performs CP correlation-based CCA in the channel #n+2 and determines whether the channel #n+2 is idle channel.

When the STA2 uses the legacy frame format, the STA1 may detect the frame transmitted in the channel #n+2 through calculation of the CP correlation. Thus, the STA1 may be aware that the channel #n+2 is busy. Here, the legacy frame format is a frame format used in the IEEE 802.11ac standard, the IEEE 802.11n standard, and the IEEE 802.11a standard, which forms a legacy CP pattern in which the CPs of 0.8 us/0.4 us are prepended to every data duration of 3.2 us.

If the STA2 is a HEW device and transmits a frame including the symbols illustrated in FIG. 10, the STA1 cannot detect the frame transmitted in the channel #n+2 though calculation of the CP correlation. Thus, referring to FIG. 18, a problem arises in that the STA1 determines that the channel #n+2 is in idle and transmits a frame in a channel used by the STA2.

Referring to FIG. 19, the STA2 may be a HEW device transmitting a frame including the legacy CP pattern. For example, as illustrated in FIG. 13, the STA2 may transmit a frame in four bands (channel #n+2, channel #n+3, channel #n+4, and channel #n+5) and transmit a frame inserted the legacy CP pattern in both end bands (channel #n+2 and channel #n+5).

The STA1 may check CP correlation-based CCA by using the legacy CP pattern included in the frame received through the channel #n+2. Thus, the STA1 may be aware that the channel #n+2 is busy and defers an attempt to transmit through the channel #n+2 as illustrated in FIG. 17.

In this manner, when the HEW frame format has the CP periodicity like the legacy frame format, the VHT device can check the CP correlation-based CCA in the secondary channel. Thus, the HEW device may protect a transmission channel of its own, and the VHT device may prevent data loss by deferring transmission in the channel in use.

Figure 20:
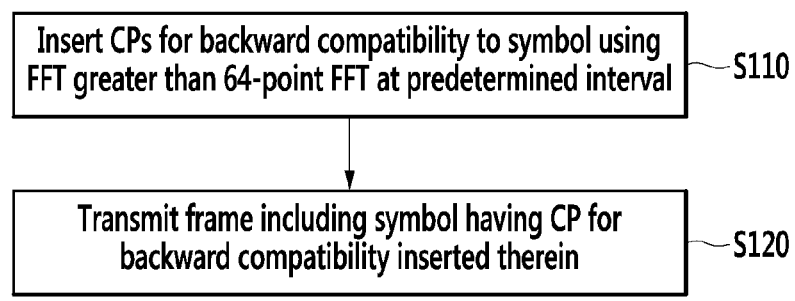
FIG. 20 is a flow chart illustrating a method for transmitting frames according to an exemplary embodiment.

FIG. 20 is a flow chart illustrating a method for transmitting frames according to an exemplary embodiment.

Referring to FIG. 20, the HEW device inserts CPs for backward compatibility into symbols using greater FFT than 64-point FFT at a predetermined interval (S110). The legacy CP pattern is inserted into a data duration of the HEW symbol. The legacy CP pattern is a CP pattern that may be recognized by the legacy device (VHT device), showing a structure in which the CP is added to each duration of 3.2 us. The CPs for backward compatibility may be inserted up to only symbol durations satisfying a CCA mid-time request time (<25 us).

The HEW device transmits frames including the symbols having the CPs for backward compatibility inserted therein (S120). Even though the VHT device receives a long HEW symbol from the HEW device, it may be able to calculate a CP correlation by using the legacy CP pattern additionally inserted into the HEW symbol.

Figure 21:
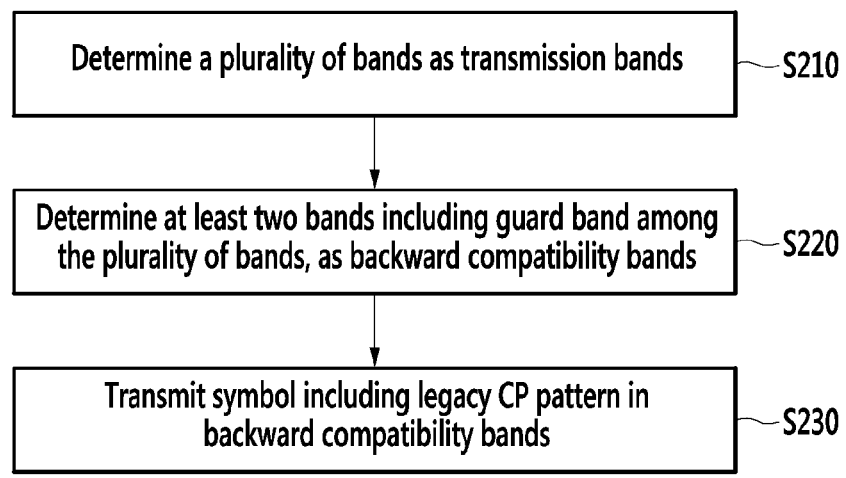
FIG. 21 is a flow chart illustrating a method for transmitting frames according to another exemplary embodiment.

FIG. 21 is a flow chart illustrating a method for transmitting frames according to another exemplary embodiment.

Referring to FIG. 21, the HEW device determines a plurality of bands as transmission bands (S210).

The HEW device determines at least two bands including a guard band among the plurality of bands, as backward compatibility bands (S220). The HEW device may determine both end bands of the plurality of bands as backward compatibility bands and may add at least one of middle bands of the plurality of bands to the backward compatibility bands.

The HEW device transmits symbols including a legacy CP pattern in the backward compatibility bands (S230).

Hereinafter, CP correlation-based CCA (mid-packet CCA) of the HEW device is described.

The HEW device may use an FFT size and a CP length different from those of the legacy device. Thus, the HEW device may be implemented to calculate both legacy CP correlation and HEW CP correlation. While the HEW device is calculating both the legacy CP correlation and the HEW CP correlation with respect to a secondary channel, when signal is detected through calculation of any one CP correlation, the HEW device determines that the corresponding secondary channel is in use. The HEW device may determine whether a correlation peak appears at every 3.6 us/4 us by calculating the legacy CP correlation. Also, the HEW device may calculate a HEW CP correlation based on the HEW symbol format.

Meanwhile, as described above with reference to FIGS. 12 to 16, the HEW device transmits symbols including the legacy CP pattern in the guard bands (side bands) of the transmission bands. That is, the CP correlation of the band (or sub-band) positioned at the end of the transmission bands may be calculated in the same manner as that of the legacy device. Thus, the HEW device may check the secondary channel CCA by calculating only the legacy CP correlation.

Hereinafter, a method for increasing sensitivity of secondary channel CCA is described.

Figure 22:
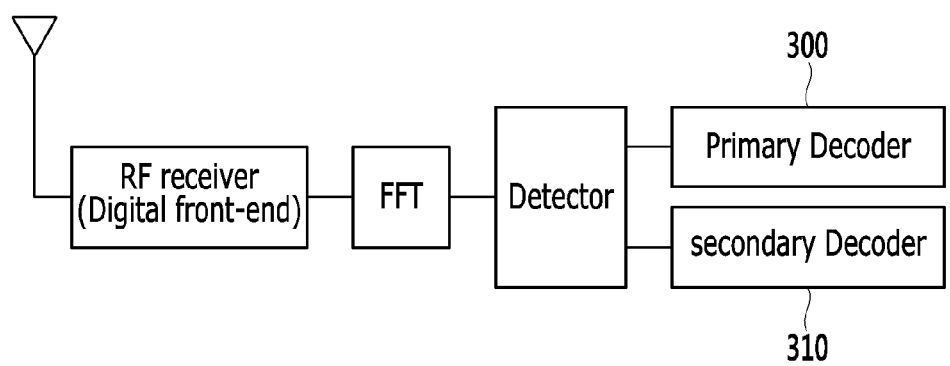
FIG. 22 is a diagram illustrating a configuration of a decoder of a wireless local area network (WLAN) device according to an exemplary embodiment.

FIG. 22 is a diagram illustrating a configuration of a decoder of a wireless local area network (WLAN) device according to an exemplary embodiment.

Referring to FIG. 22, the HEW device may use an energy detection method and a mid-packet detection method using a CP correlation for secondary channel CCA. When signal of −62 dBm or −72 dBm is detected from a secondary channel, the HEW device determines that there is a valid OFDM transmission in the secondary channel.

If the HEW device is able to check CCA at a lower level than −72 dBm, fair channel access may be performed in a primary channel and a secondary channel and network throughput may be increased. Thus, the HEW device may set a level lower than −72 dBm as a CCA threshold value, and check secondary channel CCA through virtual carrier detection, like the primary channel. For example, when 20 MHz PPDU starts at −82 dBm or higher in a 20 MHz secondary channel, the HEW device determines that the 20 MHz secondary channel is in use.

To this end, the HEW device needs to support simultaneously transmission and reception (simultaneous TX and RX) in an orthogonal frequency channel and support parallel reception (parallel RX). A receiving signal processor of the HEW device includes a primary decoder 300 for decoding a frame received in a primary channel and a secondary decoder 310 for decoding a frame received in a secondary channel.

The primary decoder 300 decodes the frame received in the primary channel, and may decode a data field of the received frame.

The secondary decoder 310 may decode a signal field of the frame received in the secondary channel. According to an exemplary embodiment, the secondary decoder 310 may be implemented to decode only a binary phase shift keying (BPSK)-modulated signal field. According to another exemplary embodiment, the secondary decoder 310 may be implemented to decode signal modulated by a higher complexity than BPSK (for example, M-QAM).

The receiving signal processor of the HEW device performs processing such as Fourier transform, or the like, on the signal received through an antenna. When the signal is received from the primary channel, a detector of the receiving signal processor delivers the input signal to the primary decoder 300. When a signal is received in the secondary channel while the signal of the primary channel is being processed, the detector delivers the signal received in the secondary channel to a designated signal field decoder, that is, the secondary decoder 310.

When a signal having a value equal to or greater than the CCA threshold value (−82 dBm) is detected according to the signal field decoding result of the decoder 310, a CCA determining unit (not shown) of the HEW device determines that the corresponding secondary channel is in use.

Hereinafter, a method for protecting, by a HEW device, a sub-channel used in a legacy device in an environment in which the HEW device and the legacy device coexist is described.

Figure 23:
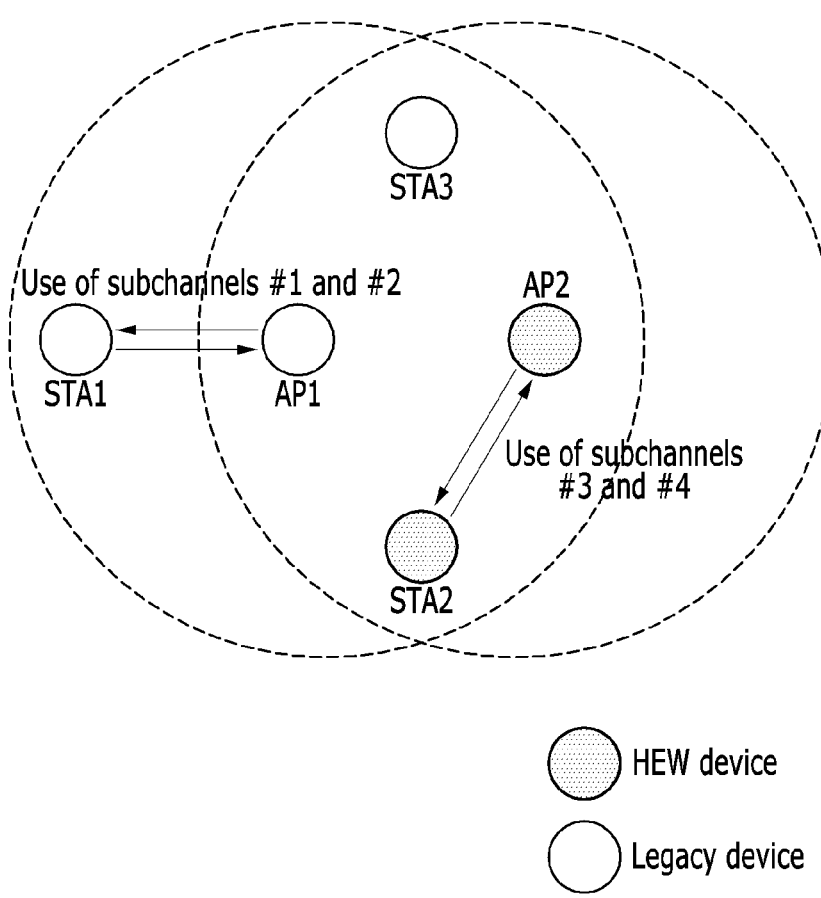
FIG. 23 is a diagram illustrating a wireless communication network according to another exemplary embodiment.

FIG. 23 is a diagram illustrating a wireless communication network according to another exemplary embodiment, and FIGS. 24 through 28 are diagrams illustrating a frame format according to an exemplary embodiment.

Referring to FIG. 23, HEW devices and legacy devices coexist in the HEW environment. Here, it is assumed that AP1, STA1, and STA3 are legacy devices that support any one of the IEEE 802.11a standard, the IEEE 802.11n standard, and the IEEE 802.11ac standard, for example. It is assumed that AP2 and STA2 are HEW devices. When four subchannels #1, #2, #3, and #4 is used as a transmission band, it is assumed that primary channels of the legacy devices are subchannel #1, and primary channels of the HEW devices are subchannel #3.

When the STA1 and the AP1 communicate using at least one of the subchannel #1 and the subchannel #2 as illustrated in FIG. 23, any one of the STA2 and the AP2 detects signals of the subchannel #1 and the subchannel #2 through a secondary channel CCA. Since a secondary channel is in use, the STA2 and the AP2 transmit data by using the subchannel #3 and the subchannel #4 by using a dynamic channel bandwidth allocation function.

Here, the HEW device may protect the subchannel #1 and the subchannel #2 used in the legacy device AP1 by transmitting frames as illustrated in FIGS. 24 through 28.

Figure 24:
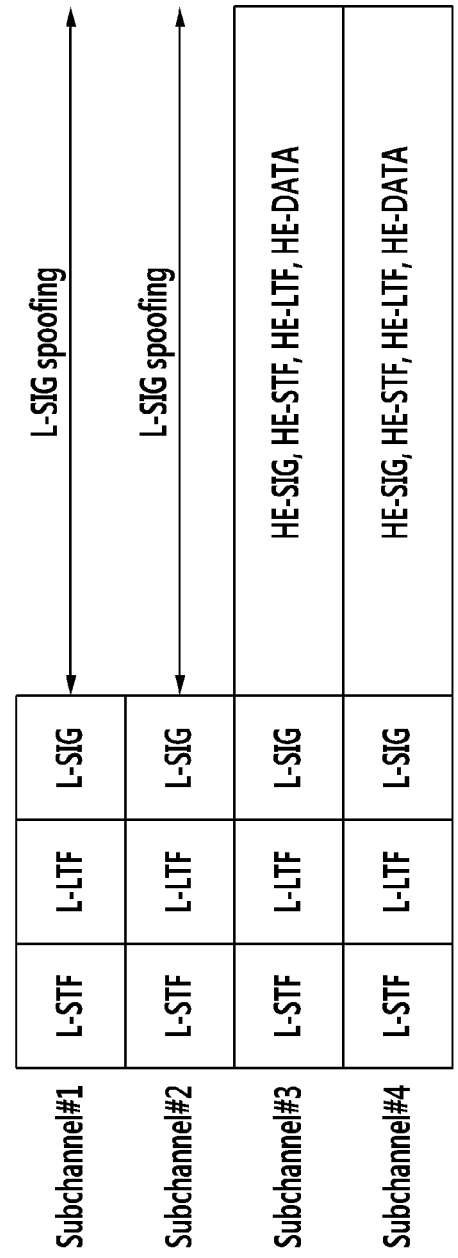

Referring to FIG. 24, the HEW device transmits HEW frames in the subchannel #3 and the subchannel #4. The HEW frames each includes a legacy compatible part and a HEW part. The legacy compatible part is a field transmitted for compatibility with the legacy device, including a legacy short training field (L-STF), a legacy long training field (L-LTF), and a legacy signal field (L-SIG). The HEW part may include a high efficiency signal field (HE-SIG), a high efficiency short training field (HE-SIF), a high efficiency long training field (HE-LTF), and a high efficiency data field (HE-DATA).

The HEW device sends a header including the L-STF, the L-LTF and the L-SIG in the subchannel #1 and the subchannel #2. The HEW device transmits a null data packet (NDP) in the subchannel #1 and the subchannel #2. But the frame includes predetermined length information in the L-SIG. Then, upon receiving the NDP in the subchannel #1 and the subchannel #2, the legacy device STA3 does not access the subchannel #1 and the subchannel #2 during the interval corresponding to the length of the L-SIG. Thus, the HEW device may protect the subchannels (the subchannel #1 and the subchannel #2) in use by blocking channel access of the STA3 through the NDP. In this manner, pretending as if data is transmitted using the L-SIG may be termed L-SIG spoofing.

Figure 25:
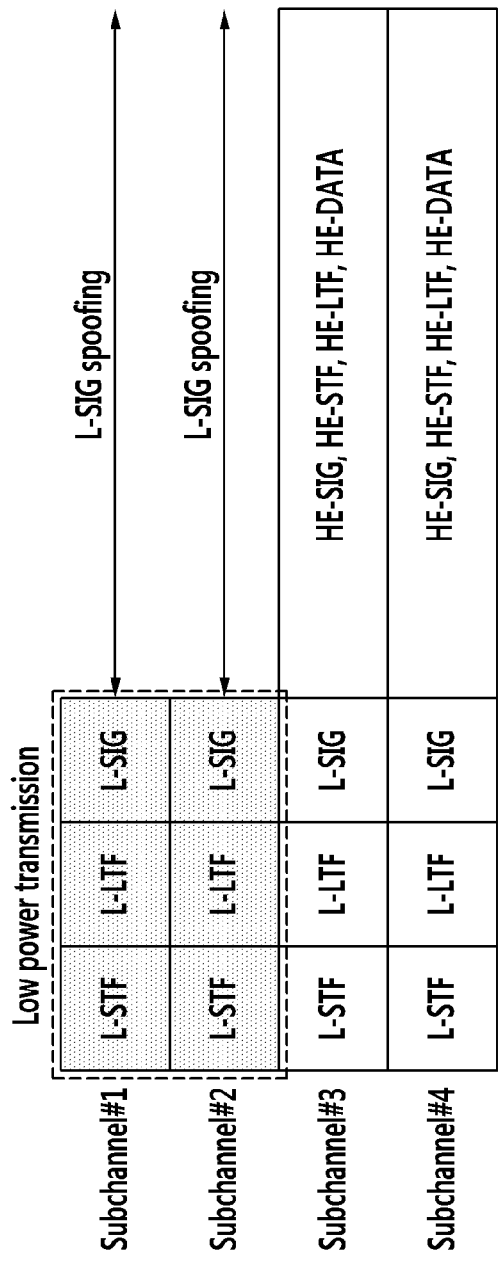

Referring to FIG. 25, the HEW device may lower transmission power of the NDP and transmit the NDP in the subchannel #1 and the subchannel #2 (low power transmission). That is, the HEW device may differently set transmission power of a data transmission channel and transmission power of the NDP transmission channel to reduce interference of the NDP on the AP1 and the STA1.

Figure 26:
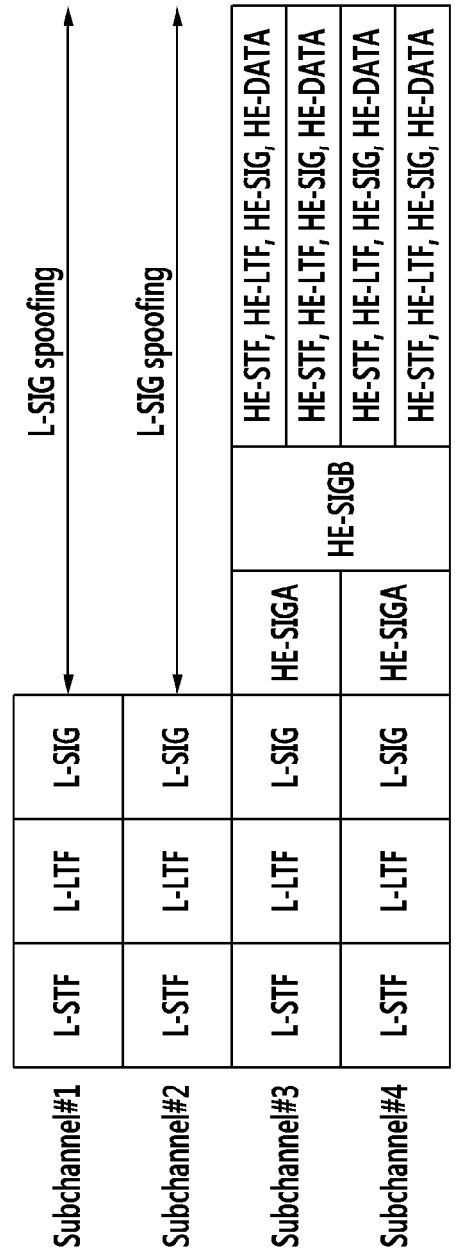

Referring to FIG. 26, HEW frame formats transmitted in the subchannel #3 and the subchannel #4 may be various. For example, the HEW part includes a signal field (HE-SIG), and the HE-SIG may be divided into a HE-SIGA and a HE-SIGB. The HE-SIGA or HE-SIGB may include Information indicating a position of a subchannel used for transmission. Also, some fields (HE-STF, HE-LTF, HE-SIG, and HE-DATA) of the HEW part may be transmitted through a plurality of sub-bands, which are divided from a subchannel.

Referring to FIGS. 27 and 28, the HEW device may transmit data in all the subchannels #1 to #4, and lower transmission power of the subchannels #1 and #2 used by other device.

The STA2 and AP2, HEW devices, may transmit data by using every channel, and may reduce an interference to the STA1 and AP1. Also, since the STA3 does not access the subchannel#1 and the subchannel #2 during an interval corresponding to L-SIG spoofing, the subchannels in use may be protected.

The HE-SIGB of the HEW part may be transmitted in every subchannel or may be transmitted in a plurality of grouped subchannels.

For example, as illustrated in FIG. 27, the HE-SIGB may be transmitted in unit of a 20 MHz channel in the subchannels #1 and #2, and may be transmitted in unit of a 40 MHz channel in the subchannels #3 and #4.

The HEW device may fragment the HE-SIGB into unit channels on the basis of interference of a transmission channel. That is, since there is interference having a predetermined level or higher in the subchannels #1 and #2, the HEW device fragments the HE-SIGB into unit channels and transmits the same, and since there is interference having a level lower than the predetermined level in the subchannels #3 and #4, the HEW device does not fragment the HE-SIGB into unit channels.

In order to allow a receive device to recognize the HE-SIGB transmitted as illustrated in FIG. 27, frame format information may be transmitted through the HE-SIGA or a request/response frame exchanged prior to a data frame. Or, since a transmission device fragments the HE-SIGB into unit channels according to channel interference, the receive device may predict the HE-SIGB transmission format transmitted as illustrated in FIG. 27 on the basis of the channel interference.

Or, as illustrated in FIG. 28, the HE-SIGB may be transmitted in a 40 MHz channel unit formed by grouping the subchannels #1 and #2, or may be transmitted in a 40 MHz channel unit formed by grouping the subchannels #3 and#4.

The HEW device may group subchannels on the basis of transmission power, and transmit the HE-SIGB in unit of the grouped channels. That is, the HEW device may group the subchannels #1 and #2 transmitted with low power to transmit the HE-SIGB therein.

In order to allow the receive device to recognize the HE-SIGB transmitted as illustrated in FIG. 28, the frame format information may be transmitted through the HE-SIGA or through a request/response frame exchanged prior to a data frame. Or, since the transmission device determines transmission power according to channel interference, the receive device may predict a HE-SIGB transmission format on the basis of the channel interference.

Figure 29:
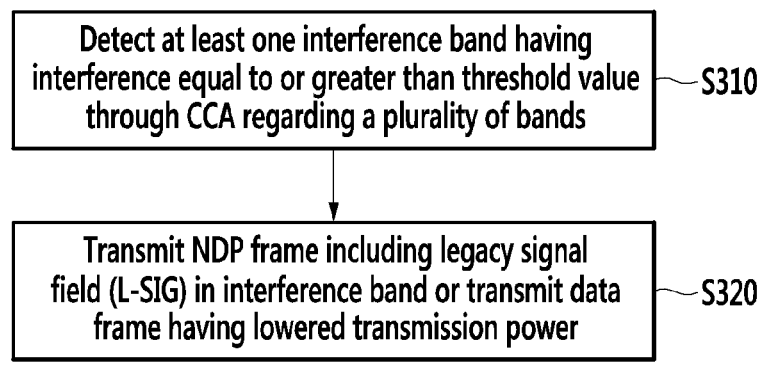
FIG. 29 is a flow chart illustrating a method for transmitting frames according to another exemplary embodiment.

FIG. 29 is a flow chart illustrating a method for transmitting frames according to another exemplary embodiment.

Referring to FIG. 29, the HEW device detects at least one interference band having interference equal to or greater than a threshold value through CCA regarding a plurality of bands (S310). Referring to FIG. 23, the HEW device detects the subchannels #1 and #2 as interference bands.

The HEW device transmits an NDP frame including the legacy signal field (L-SIG) or a data frame having lowered transmission power in the interference bands (S320). The HEW device determines a data transmission band through CCA regarding a plurality of bands. The HEW device may transmit an NDP including the L-SIG as illustrated in FIGS. 24 through 26 in the interference bands, while transmitting a data frame in the data transmission band. Or, the HEW device may transmit a data frame having lowered transmission power as illustrated in FIGS. 27 and 28 in the interference bands, while transmitting a data frame in the data transmission band.

In this manner, the HEW device may block the legacy device to access a channel by transmitting predetermined information even in the band including interference among a plurality of bands.

So far, the method of the present invention described above with reference to the drawings is performed in a device including a processor, a memory, and a transceiver, and the device is included in a WLAN device supporting a version prior to the IEEE 802.11ax or the IEEE 802.11ax. The WLAN device includes a memory storing instructions for performing the method of the present invention or loading an instruction from a storage and temporarily storing the loaded instruction, a processor executing an instruction stored in the memory or loaded from the storage to process the method of the present invention, and a transceiver transmitting a frame generated by the processor or receiving a frame transmitted through a wireless communication network. Here, the processor may include a baseband processor 10 of FIG. 1, and the memory may include the memory 40 of FIG. 1, and the transceiver may include the RF transceiver 20 and the antenna unit 30 of FIG. 1.

In this manner, according to an exemplary embodiment, the VHT device may recognize CPs in a frame transmitted from the HEW device and use CP correlation-based CCA. According to an exemplary embodiment, since the VHT device may determine whether a channel is occupied by the HEW device by applying the CP correlation-based CCA in a secondary channel, a collision probability in a HEW environment may be lowered and network throughput may be increased.

The foregoing exemplary embodiments of the present invention are not implemented only by an apparatus and a method, and therefore, may be realized by programs realizing functions corresponding to the configuration of the exemplary embodiment of the present invention or recording media on which the programs are recorded.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for transmitting frames of a device in a wireless local area network (WLAN), the method comprising:
generating a symbol, the symbol including a data duration and a cyclic prefix prepended to the data duration, in which a plurality of legacy cyclic prefixes are periodically located in the data duration at intervals corresponding to a symbol duration of a Very High Throughput (VHT) symbol; and
transmitting a frame including the symbol,
wherein the length of the data duration is 12.8 microseconds.

2. The method of claim 1, wherein respective lengths of the legacy cyclic prefixes are 0.8 us or 0.4 us.

3. The method of claim 1, wherein the legacy cyclic prefixes are included in the symbol such that correlation peaks appears at intervals of 4 us or 3.6 us when a Cyclic Prefix (CP) correlation of the symbol is calculated.

4. The method of claim 1, wherein
the symbol includes the plurality of legacy cyclic prefixes corresponding to a legacy cyclic prefix pattern, and
the legacy cyclic prefix pattern shows that the legacy cyclic prefixes are each located at every 3.2 us interval.

5. The method of claim 1, wherein the symbol is generated by using a 256-point Fast Fourier Transform (FFT).

6. A method for transmitting frames of a device in a wireless local area network (WLAN), the method comprising:
generating a symbol satisfying backward compatibility; and
transmitting a frame including the symbol satisfying backward compatibility in at least one backward compatibility band designated among a plurality of bands,
wherein the symbol satisfying backward compatibility includes a data duration and a High Efficiency (HE) cyclic prefix prepended to the data duration, and the length of the data duration is 12.8 microseconds, and
wherein the symbol satisfying backward compatibility includes a plurality of legacy cyclic prefixes corresponding to a legacy pattern, and the legacy pattern includes the legacy cyclic prefixes periodically transmitted according to a symbol duration of a Very High Throughput (VHT) symbol.

7. The method of claim 6, wherein the backward compatibility band includes guard bands which are in both ends of the plurality of bands.

8. The method of claim 6, wherein the backward compatibility band includes guard bands which are in both ends of the plurality of bands, and at least one of middle bands which are in the middle of the plurality of bands.

9. The method of claim 6, wherein the legacy pattern shows that the legacy cyclic prefixes are located at every 3.2 us interval.

10. The method of claim 6, wherein the legacy cyclic prefixes are located in the data duration of the symbol satisfying backward compatibility.

11. The method of claim 7, wherein respective lengths of the legacy cyclic prefixes are 0.8 us or 0.4 us.

12. The method of claim 6, wherein the legacy cyclic prefixes are included in the symbol satisfying backward compatibility such that correlation peaks appears at intervals of 4 us or 3.6 us when a Cyclic Prefix (CP) correlation of the symbol satisfying backward compatibility is calculated.

\* \* \* \* \*